Jan. 2, 1940.   C. M. WHITE, JR   2,185,488
ROAD MARKER
Filed Nov. 12, 1938
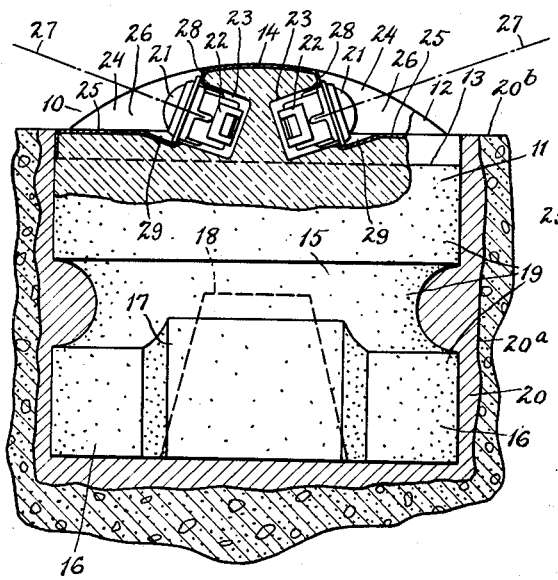
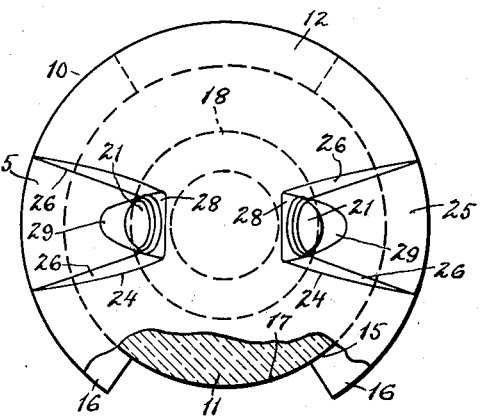
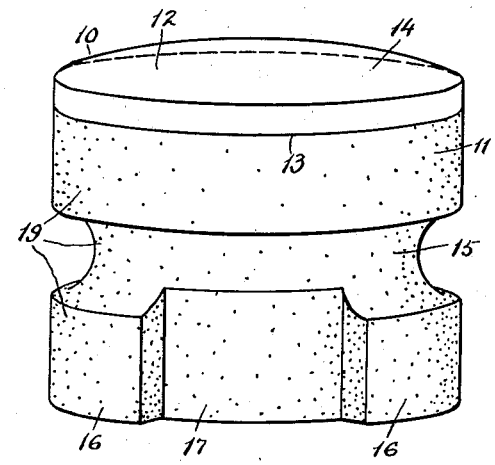
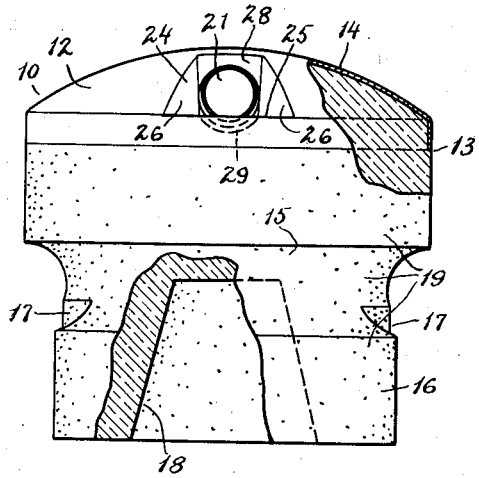
Inventor,
C. M. White, Jr.
By Robert M Pierson,
Attorney Patented Jan. 2, 1940

2,185,488

UNITED STATES PATENT OFFICE 2,185,488

ROAD MARKER

Charles M. White, Jr., Akron, Ohio, assignor to The Colonial Insulator Company, Akron, Ohio, a corporation of Ohio Application November 12, 1938, Serial No. 240,031

3 Claims. (Cl. 94—1.5)

This invention relates to markers for indicating traffic lanes, safety zones, etc., on street and roadway pavements. My principal object is to provide an improved marker securely mountable on or in the pavement and sharply visible, by color contrast with the surrounding pavement, in the daytime as well as by artificial light. Further objects are to provide an improved device of that character, incorporating one or more reflector buttons for better visibility at night, and a mode of positioning and mounting one or more reflectors in the marker body in such manner as to reduce its height of projection above the pavement level. Additional purposes in view are to provide such a combination of shape, smoothness and durability of the marker top as will cause it to shed dirt and permanently retain high light-reflecting and diffusing characteristics.

This application is a continuation in part of my prior application Ser. No. 220,463, filed July 21, 1938.

Of the accompanying drawing,

Fig. 1 is a partial longitudinal section of a road or street pavement having embedded therein a marker, shown partly in section, embodying my invention in a preferred form.

Fig. 2 is a plan view of the marker, partly broken away and in section.

Fig. 3 is an edge view, partly in section, looking endwise at one of the reflector buttons.

Fig. 4 is a perspective view showing a modification.

Referring at first to Figs. 1 to 3, 10 indicates generally the pavement marker including a monolithic body 11 of opaque ceramic material whose exposed upper surface is of light color such as white, yellow or other color which will reflect and diffuse from about 60 per cent to substantially 100 per cent of the light falling upon it. The preferred material of this body, at least of its upper portion, is porcelain, molded from a suitable white clay and hardened by firing. Its upper end or head portion 12, which projects above the pavement level, is convex or dome-like and relatively shallow, to serve as a conspicuous marker, to house the reflector buttons when the latter are used, to help shed dirt and provide a slightly bumpy surface for warning the vehicle driver. The whole of this dome-like portion and the upper rim of the subjacent embedded portion down to the line 13 is coated with a thin layer 14 of vitreous glaze to which, by reason of its smoothness, dirt will not easily cling, which is more or less self-cleaning by the action of rubber tires and is washable through the gravity action of rain on the domed surface.

For a light-colored exposed surface other than pure white, such as yellow, the coloring pigment may be incorporated in the glaze layer 14, and also, if desired, or alternatively, in the clay immediately underlying said layer. The relatively high inherent visibility is conferred by reflection and diffusion, from the particles of the opaque body material and the pigment, if any, of most or substantially all of the rays of light falling upon the surface of the marker.

While various plan shapes could be used, a circular shape, as illustrated, is preferred as one of the easiest to make and embed in the pavement. The lower body is belted with an annular groove 15 for interlocking with the embedding material, against vertical displacement. The base is formed with segmental projections 16, separated by recesses 17, to interlock with the embedding material against rotative movement. The base is further formed with a downwardly-open, upwardly-tapering recess 18 to save material and promote uniform shrinkage during manufacture. It will be understood that the lower body contour is subject to variation. The slightly rough, unglazed, molded surface 19 of the marker body below the lower line 13 of the glaze, indicated by a light stippling, adheres better than would a smooth surface to the immediate embedding material 20, such as sulphur, tar or other suitable cement which is poured in a molten condition around the marker, in a hole 20a formed in the pavement 20b, to then harden and act as a retainer and cushion for the device. Such a rough-faced joint also makes an efficient seal against the penetration of water.

For a day-and-night marker, a pair of lens reflector buttons 21 of familiar construction, provided with the usual spring retainers 22, are mounted in apertures 23 formed in the marker body 11 at the inner ends of a pair of upwardly-open recesses 24 in the dome of said body. Each recess has a floor 25 extending outwardly to the periphery of the body 11, substantially in the base plane of the dome, at the pavement level, and slightly flaring sides 26. The two reflectors 21 are oppositely directed, longitudinally of the roadway, to reflect the headlamp rays of motor vehicles approaching from either direction, for guiding the driver at night on a dark roadway, and their optical axes 27 are directed slantingly upward at an acute angle, which may be of the order of 20 degrees from the plane of the pavement. The end faces 28 of the recesses 24 in which the reflectors are mounted are slanted at a complementary angle. The bottom of each recess is further formed with a slight depression 29 under and outwardly of the lower edge of the button 21, for receiving said lower edge below the general floor level. The combination of these features permits a reduction in the height of projection of the dome above the road surface, while admitting headlamp rays to and from the reflector through its full aperture, from a safe driving distance between the vehicle and the marker, and still leaves sufficient material between the dome crest and the apertures 23 to avoid cracking of the porcelain by traffic blows. With a reflector button of $\frac{9}{16}$ inch head diameter, the dome height may be $\frac{9}{16}$ inch, or substantially 15 per cent of the greatest diameter of the marker, which may be of the order of 3¾ inches. While subject to some variation, the approximate dimensions given in this example afford a desirable combination of qualities including ample light-reflecting surface, dirt-shedding properties and sufficient bumping or shocking capacity to encourage keeping within a lane boundary without injuring or dangerously swerving the wheel tires when the marker is encountered.

The requirements for a practical and commercially acceptable luminous road marker of the type which is disclosed in the description just given are numerous. The absence of any of the features which are enumerated makes an inferior article. In the form shown all of the requirements are supplied in a single combination set forth in the claims.

The marker must not work loose in the pavement under the excessive vibration to which the road is subjected by the passage of trucks or other heavy vehicles. The marker shown herein is securely interlocked with the pavement and prevented from rising by the groove 16 in its base into which the embedding material will flow and set thus insuring a firm anchorage. This property is enhanced by the fact that the glaze on the top is omitted from the base to leave the embedded area of the marker body with a rough or semi-porous surface to which the surrounding pavement material will knit.

A marker of the luminous type must not be capable of rotation in its seat otherwise, if looseness develops the marker will turn so that the luminous reflectors are not presented to the rays of light from approaching headlights and the effectiveness of the marker after dark would be lost.

The marker must be visible during the day and should not accumulate dirt or oil so that it will blend with the surrounding pavement. This requirement is met by the glazed surface on the top or dome of the marker which will shed dirt, oil or other foreign matter. The porcelain glaze will not corrode or roughen, and the passage of tires over this glazed surface will scour any adhering matter therefrom.

The marker must offer the least possible protuberance from the surface of the pavement and must not present any abrupt obstruction. This is a safety feature which is very important as an abrupt formation in the pavement will be objectionable and dangerous. A fast moving automobile upon striking an abrupt surface rising from the pavement may be swerved from its course, and this is particularly true when the pavement is wet or carries a film of oil. The marker shown here supplies that requirement by the fact that the top or dome is low and rounded uniformly over its entire surface so that a wheel approaching from any angle will not tend to be deflected and the bump will be largely dissipated or absorbed by the tire.

The marker must resist any effort to dislodge it from the pavement by the passage of scrapers or snow ploughs. This is one of the principal objections to the markers shown in the prior art in which projections or steep walls presented in any direction will afford points of engagement by a scraper or snow plough. In markers in which the underside of the head or dome rests upon the top of the pavement, unevenness in the pavement, or sinking of the pavement around the marker will expose the edge of the head and afford points under which the blade of a scraper or snow plough will take hold and pull the marker out of its seat or break the head. Reflectors or the like which project above the surface of the marker also make it vulnerable to such an attack. In the marker shown here this very serious fault is overcome by the fact that the reflectors are set into pockets so that they are completely below the dome-like upper surface. Because the rounded dome-like top rises directly from the base or body of the marker no separation of the pavement and the underside of the dome can occur.

The reflectors must always be exposed in order to render the marker effective at night. In former markers in which the reflectors are set in pockets in the top these pockets will accumulate dirt and debris which will cover the reflectors, and this is particularly true when the markers are set in a grade in the road, for rain will wash down dirt or mud which will collect in the pockets. This objection is overcome by the design of the pockets or recesses and the location of the reflectors therein. It will be noted that each pocket or recess flares outwardly and that the reflector is set out from the rear wall and not embedded therein. The glaze on the top of the marker is extended into the pocket and the base or bottom of the pocket is also a part of the body and carries the same coating of glaze. As a result the passage of tires over the surface of the marker will automatically remove any dirt which may become lodged in the pockets by the suction and wiping action caused by the tread of the tire, an effect which is enhanced by the presence of the glaze on the walls and bottom of the pocket.

In the modification shown in Fig. 4, the material and shape of the body 11 and application of a glazing layer 14 over its domed top, down only to a line such as 13 a short distance below the rim, are the same as before, but the top is plain, reflector buttons and their recesses and mountings being omitted, and the cost of manufacture is less. The domed top may then be somewhat shallower than previously described, while retaining its dirt-shedding and tire-bumping functions by reason of the convexity. These plain markers are useful in many situations where headlight reflection is not required except as conferred by the light-colored porcelain surface, they are sharply distinguishable at long distances in the daytime and sufficiently so by moonlight or artificial light to substantially promote safe driving.

The use of either form of this invention reduces the expense of maintaining traffic lane and safety zone markings by avoiding the necessity of using painted stripes.

When the term "substantially cylindrical" is used in the claims I intend to cover primarily a cylindrical block, but it is not intended to exclude from the scope the claims variations from a true cylinder.

The described forms of embodiment may be varied without departing from the scope of my invention as defined in the claims.

I claim:

1. A pavement marker comprising a monolithic substantially cylindrical ceramic body adapted to lie below the surface of the pavement with its upper edge flush therewith and having an upper surface formed as a shallow rounded dome-like top rising above the pavement, the marker being provided with formations adapted to interlock with the pavement body and prevent upward and rotational movement of the marker in the pavement, a recess formed in the dome and having outwardly flaring side walls, a rear wall and a bottom wall, a luminous reflector set in the rear wall of said recess and lying below the surface of the rounded dome, and a coating of glaze over the top and extending into the recess and over all of the walls thereof.

2. A pavement marker comprising a monolithic substantially cylindrical body adapted to lie below the surface of the pavement with its upper edge flush therewith and having an upper surface formed as a shallow rounded dome-like top rising above the pavement, the marker being provided with formations adapted to interlock with the pavement body and prevent upward and rotational movement of the marker in the pavement, a recess formed in the dome and having outwardly flaring side walls, a rear wall and a bottom wall, a luminous reflector set in the rear wall of said recess and lying below the surface of the rounded dome, and a smooth reflecting surface over the top and extending into the recess and over all of the walls thereof.

3. A pavement marker comprising a monolithic substantially cylindrical ceramic body adapted to lie below the surface of the pavement with its upper edge flush therewith and having an upper surface formed as a shallow dome-like top rising above the pavement, the marker being provided with formations adapted to interlock with the pavement body and prevent upward and rotational movement of the marker in the pavement, a recess formed in the dome and having outwardly flaring side walls, a rear wall and a bottom wall, a luminous reflector set in the rear wall of said recess and lying below the surface of the rounded dome, and a coating of glaze over the dome and extending into the recess and over all of the walls thereof, the glaze terminating near the top of the marker to provide an unglazed body beneath the surface of pavement.

CHARLES M. WHITE, Jr.